Aug. 12, 1969 YOSHIAKI KAMOJI ET AL 3,461,249

MULTI-TRACK TAPE DRIVE SYSTEM FOR REVERSING TAPE TRAVEL AFTER CESSATION OF INTELLIGENCE SIGNAL OUTPUT FROM ALL CHANNELS

Filed Feb. 7, 1966 3 Sheets-Sheet 1

Inventors
Yoshiaki Kamoji
Shoichi Nakamura by Hill, Sherman, Meroni, Gross & Simpson Attys.

MULTI-TRACK TAPE DRIVE SYSTEM FOR REVERSING TAPE TRAVEL AFTER CESSATION OF INTELLIGENCE SIGNAL OUTPUT FROM ALL CHANNELS

Filed Feb. 7, 1966 3 Sheets-Sheet 2

Inventors
Yoshiaki Kamoji
Shoichi Nakamura by Hill, Sherman, Meroni, Gross & Simpson Attys.

Inventors
Yoshiaki Kamoji
Shoichi Nakamura
by Hill, Sherman, Meroni, Gross & Simpson Attys.

3,461,249

MULTI-TRACK TAPE DRIVE SYSTEM FOR REVERSING TAPE TRAVEL AFTER CESSATION OF INTELLIGENCE SIGNAL OUTPUT FROM ALL CHANNELS

Yoshiaki Kamoji and Shoichi Nakamura, Tokyo, Japan, assignors to Sony Corporation, Tokyo, Japan, a corporation of Japan Filed Feb. 7, 1966, Ser. No. 526,661
Claims priority, application Japan, Feb. 9, 1965, 40/7,382, 40/7,383
Int. Cl. G11b *5/48*
U.S. Cl. 179—100.2 7 Claims

ABSTRACT OF THE DISCLOSURE

A magnetic reproducing system for a multi-track record tape in which each track is scanned by a separate head, the outputs of the heads being fed to a mixer which provides a control signal whenever at least one of the heads supplies a signal thereto, in combination with control means which respond to the control signal to reverse the direction of movement of the drive motor, and a time delay means between the mixer and the control means which operates to delay the reversal of the drive means for a predetermined time interval after cessation of an output from the mixer.

The present invention relates to a magnetic reproducing system, and more particularly, to an automatic magnetic sound reproducing system employing multi-track record tapes.

Several types of automatic control systems for changing the direction of movement of a multi-track tape have heretofore been proposed. One system of this kind requires the presence of an electrically conductive coating on the tape, the coating being positioned at the end of the recorded portions and operating to bridge across switch contacts in the tape reproducing machine, the switch functioning to reverse the direction of operation of the drive motor. In another system, a non-audible sound is impressed on the tape beyond the ends of the recorded channel, and cooperates with a suitable sensing means in the tape reproducer to actuate the reversal of the tape drive mechanism. In both instances, however, it is necessary that the tape be altered, and that suitable sensing means be provided in the tape reproducer.

In accordance with the present invention, we provide a tape transporting mechanism which does not rely upon the presence of a conductive strip or a pre-recorded signal on the tape to energize a tape drive reversal system. Consequently, the magnetic reproducer of the present invention can be used with any type of pre-recorded tape which has non-recorded portions at both ends thereof.

One of the objects of the present invention is to provide a magnetic reproducing system for a multi-track recording tape which does not require any change in the multi-channel tape.

Another object of the invention is to provide an improved magnetic reproducing assembly which can be selectively controlled for continuously repetitive operation, for reproducing only once in both directions, or for reproducing only in one direction.

Other objects, features and advantages of the present invention will become apparent from the following description taken in conjunction with the accompanying drawings in which.

Figure 1:
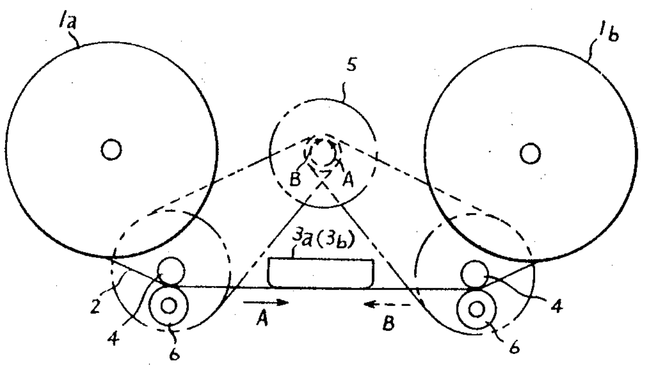
FIGURE 1 is a somewhat schematic plan view of a magnetic reproducing assembly to which the improvements of the invention can be applied.

In FIGURE 1, there is illustrated a reversible tape reproducing apparatus which can be used with the present invention. In the reproducing apparatus, a magnetic tape 2 is transported from one reel 1*a* to the other reel 1*b* as indicated by the full line arrow A when signals are recorded on one track $T_1$ of the tape 2 by means of a magnetic head 3*a*. In the other direction, the magnetic tape 2 is transported from the reel 1*b* to the first reel 1*a* as indicated by the broken line B, when they are reproduced from a second magnetic track $T_2$ of the tape 2 in contact with a second magnetic head 3*b*.

According to the present invention, upon completion of reproduction of the signal $S_1$ or $S_2$ recorded on magnetic tracks $T_1$ and $T_2$ respectively, the magnetic tape 2 is automatically transported in the reverse direction, so that the other of the two signals on the magnetic track can then be reproduced.

The remainder of the assembly shown in FIGURE 1 includes a pair of spaced capstans 4 driven by a motor 5, and having pinch rollers 6 pressing the magnetic tape 2 against their associated capstans.

Figure 2:
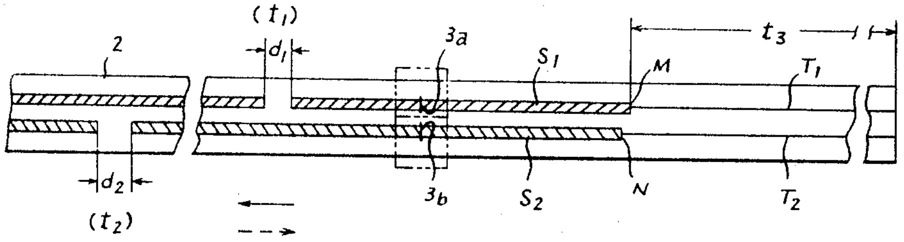
FIGURE 2 is a plan view of a magnetic tape which can be used in accordance with the present invention.

In the showing of FIGURE 2, reference characters M and N represent the terminal point of the signal $S_1$ recorded on the track $T_1$, and the starting point of the signal $S_2$ recorded on the track $T_2$. No signals are recorded on the tape from the points M and N to the physical end of the tape, a distance identified as a time interval $t_3$.

Gaps in recording in the various channels have been indicated at $d_1$ for channel $T_1$, and $d_2$ for track $T_2$. These gaps require intervals of $t_1$ and $t_2$, respectively, to pass the reproducing head.

Figure 3:
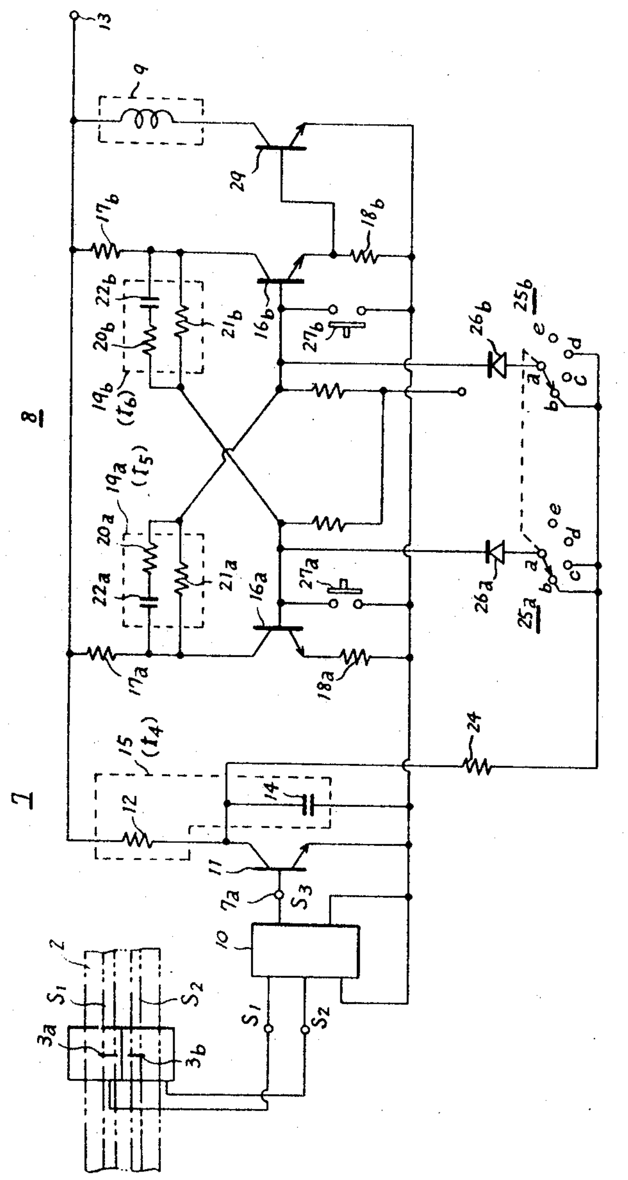
FIGURE 3 is a circuit diagram illustrating one example of the reproducing system employed in the magnetic reproducer of the present invention.

In the circuit of FIGURE 3, reference numeral 7 indicates generally a detecting circuit for detecting the presence of signals from the magnetic tape 2, and reference numeral 8 has been applied to a multivibrator circuit which is controlled by the output of the detecting circuit 7. A switching circuit generally indicated at numeral 9 is connected to the output stage of the multivibrator circuit 8.

The multivibrator circuit is selectively changed from an astable (free running) condition to a bistable condition, depending upon the presence or absence of various bias voltages therein. When both bias sources are present, the multivibrator 8 is in the astable condition, and when one of the bias sources is removed, the multivibrator becomes a bistable circuit, as will be apparent from succeeding portions of this description.

When no signal is applied to the detecting circuit 7 from the magnetic tape 2 for a predetermined interval of time, the operative condition of the bistable multivibrator circuit 8 is altered from one stage to another, to drive the motor 5 in the forward direction indicated by the full line arrow A, or in the reverse direction indicated by the broken line arrow B depending upon the value of the output applied to the switching circuit 9 from the multivibrator circuit 8.

In the specific form of the invention shown in FIGURE 3, the signals $S_1$ and $S_2$ of the magnetic tracks $T_1$ and $T_2$ respectively which are obtained by the magnetic heads *3a* and *3b* are mixed together in a mixer circuit 10, and the resulting signal $S_3$ is applied to the detecting circuit 7. The latter circuit may be composed of a transistor 11 having its emitter connected directly to ground, and having its collector connected through a resistor 12 to a power supply terminal 13, and also being grounded through a capacitor 14. The resistor 12 and the capacitor 14 constitute a time delay circuit 15 having a time constant $t_4$.

The multivibrator circuit 8 is of conventional design, employing transistors 16*a* and 16*b*. Collector resistoss 17*a* and 17*b* are interposed between the power supply terminal 13 and the respective collector terminals. Emitter resistors 18*a* and 18*b* connect the emitters of the two transistors to ground potential. The components contained within the boxes identified at 19*a* and 19*b* connect the base of one of the transistors to the collector of the other, and vice versa. The circuits 19*a* and 19*b*, respectively, include resistors 20*a*, 20*b*, 21*a* and 21*b*, and capacitors 22*a* and 22*b*. The circuits 19*a* and 19*b* have time constants $t_5$ and $t_6$, respectively, which can be substantially equal to each other. A bias voltage for the multivibrator circuit 8 is provided by means of a power supply terminal 23 from a suitable source (not shown). The junction between the collector of the transistor 11 and the resistor 12 in the detecting circuit 7 is connected to the bases of the transistors 16*a* and 16*b* of the multivibrator 8 through a resistor 24, and switches 25*a* and 25*b*, together with diodes 26*a* and 26*b* which are connected in the forward direction. The switches 25*a* and 25*b* are shown ganged together, and have four stationary contacts *b*, *c*, *d* and *e* for selectively engaging a moving contact *a*. One end of each of the diodes 26*a* and 26*b* is connected to the moving contact *a*, while the stationary contacts *b* and *c* of switch 25*a*, and stationary contacts *b* and *d* of switch 25*b* are respectively connected through the resistor 24 to the collector of the transistor 11. The remaining contacts on each of the switches 25*a* and 25*b* are open. In addition, short-circuiting switches 27*a* and 27*b* are interposed between the bases of the transistors 16*a* and 16*b* of the multivibrator 8 and ground potential, thereby permitting deactivation of the control circuitry including switches 25*a* and 25*b*, and diodes 26*a* and 26*b*.

The switching circuit identified at reference numeral 9 in FIGURE 3 may take the form of a relay which is connected to the collector of a D.C. amplifying transistor 29 connected to the output side of the multivibrator circuit 8. When the relay coil is supplied with current, it drives the motor 5 in the direction indicated by the full line arrow A to transport the tape 2 in the direction illustrated in FIGURE 1. When the relay is not supplied with current, the motor 5 is driven in the opposite direction indicated by the broken line arrow B to cause the tape 2 to travel in the opposite direction indicated by the broken line arrow B.

The operation of the circuit will now be described in detail. At the outset, it is assumed that the moving contacts *a* of the switches 25*a* and 25*b* are in the position shown in FIGURE 3, namely, connected to stationary contacts *b* of the respective switches. Under these conditions, when no input is applied to the transistor 11 of the detecting circuit 7, and consequently the transistor 11 is inoperative, the capacitor 14 is charged and this voltage is impressed through the diodes 26*a* and 26*b* to the bases of both the transistors 16*a* and 16*b* of the multivibrator circuit 8. By properly selecting the bias voltage E, the transistors 16*a* and 16*b* constitute part of an astable or free running multivibrator circuit which is alternately switched on and off in accordance with the time constants $t_5$ and $t_6$ determined by the time constant circuits 19*a* and 19*b* connected thereto. In a typical example, the time constants $t_5$ and $t_6$ are in the range from about 10 to 20 seconds, and usually at about 12 seconds.

Figure 4:
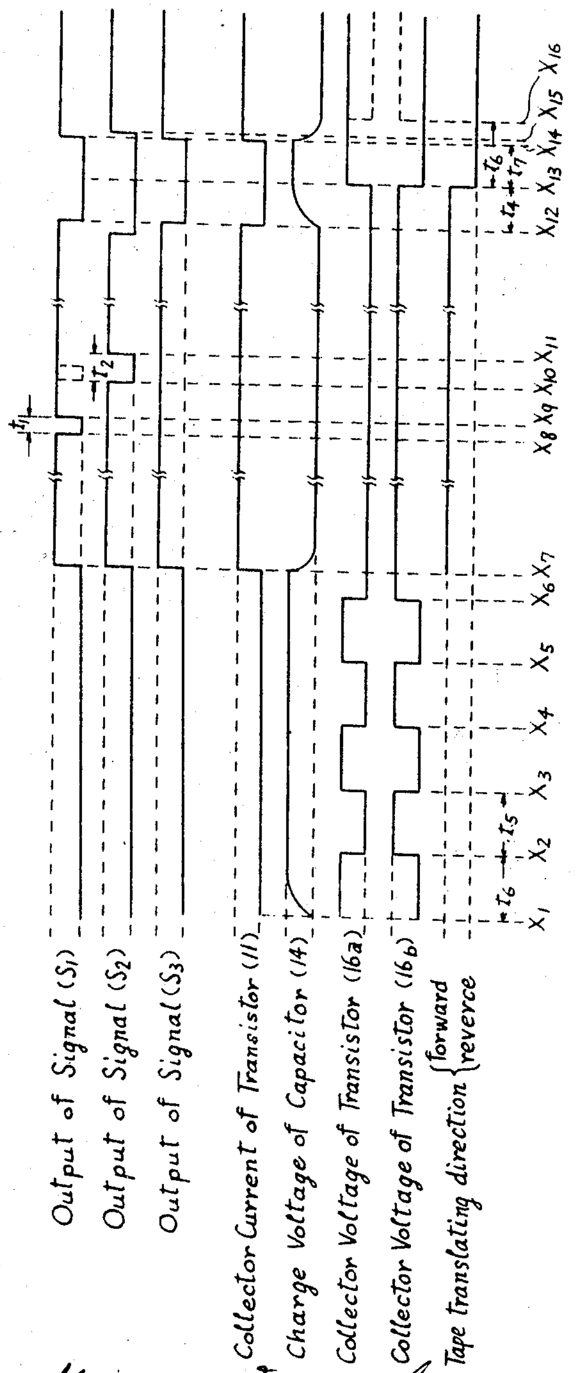
FIGURE 4 is a timing chart illustrating the wave forms at various points in the circuit of FIGURE 3 at particular time intervals.

The operation of the multivibrator circuit 8 during this no signal interval is illustrated by the wave forms from the time $X_1$ to $X_6$ in the wave forms of FIGURE 4. The specific half periods for the oscillation frequency are shown as time intervals $t_5$ and $t_6$.

Now, if the magnetic tape 2 starts to travel at the time $X_7$ when the transistor 16*a* is in the off state and the transistor 16*b* is in the on state and consequently the transistor 29 becomes conductive, the signal $S_3$ from the mixer circuit is applied ot the transistor 11 of the detecting circuit 7 to switch it on, causing the capacitor 14 to be discharged. As a result, the multivibrator circuit 8 becomes bistable, and the tape 2 is driven continuously in the direction indicated by the full line arrow A to FIGURES 1 and 2, thereby reproducing the signal $S_1$. This condition persists throughout the time intervals extending from $X_7$ to $X_{12}$ in the diagram. During this interval, since the transistor 11 is controlled by the signal $S_3$ produced by mixing the two channel signals, even if the signal $S_1$ of one of the first track $T_1$ drops to zero between the times $X_8$ and $X_9$ as indicated by the time gap $t_1$, the transistor 11 is held in the on state by the signal $S_2$ of the other track $T_2$, and hence the bistable multivibrator circuit 8 continues to operate in the same manner. Even if the signal $S_1$ should drop to zero during the time period $X_{10}$ to $X_{11}$ and the signol $S_2$ should also drop to zero during this interval, the time constant $t_4$ of the time constant circuit 15 is sufficiently greater than the intervals $t_2$ so that the bistable multivibrator circuit will not change its operative condition. The time constant $t_4$ is, however, smaller than the time constants $t_5$ and $t_6$, and is usually in the range from 3 to 10 seconds and typically may be on the order of 8 seconds.

Accordingly, the magnetic tape 2 is continuously transported in the direction indicated by the arrow A to reproduce signal $S_1$ to the terminal point M without interruption. At the time $X_{13}$ when the output signal $S_3$ of the mixer has been off for a period of 8 seconds, equaling the time constant $t_4$, the voltage across the capacitor 14 of the detecting circuit 7 rises sufficiently to switch on the transistor 16*a* of the bistable multivibrator circuit 8 and thereby reverse the operative condition of the multivibrator circuit 8. Consequently, supply of power to the relay 9 is interrupted, thereby reversing the polarity of the power to the motor 5, driving the motor 5 in a reverse direction, it being understood that the relay contacts act as part of a reversing circuit so that the motor 5 is driven in one direction when the relay coil is energized, and in the opposite direction when the relay coil is deenergized. As a result, the magnetic tape is driven in the direction indicated by the broken line B illustrated in FIGURE 2. It should be apparent, of course, that the time interval $t_3$ required for the tape to proceed to its end is longer than the time constant $t_4$.

Thus, the direction of travel of the magnetic tape 2 is reversed but there is a time interval $t_7$ required from the time $X_{13}$ to the time $X_{14}$ when reproduction of the signal $S_2$ is initiated. However, since the detecting circuit 7 is controlled by the signal resulting from the mixing of the signals $S_1$ and $S_2$, the time $t_7$ is substantially the same as the time interval $t_4$ extending from the completion of reproduction of the signal $S_1$ to the reversing of the tape driving direction. In the cited instance, the time $t_7$ is approximately 8 seconds. This time interval is shorter than the 12 second time constant assumed for $t_5$ and $t_6$ and necessary for the change of the operative condition of the bistable multivibrator circuit 8, so that the circuit 8 is held in its aforementioned operative condition, permitting the head 3*b* to reproduce the signal $S_2$. If no signal is produced within the 12 seconds interval of the time constant $t_5$ or $t_6$ after the direction of travel of the tape 2 has been reversed, the direction of the tape travel is again reversed at the time $X_{16}$ illustrated in FIGURE 4. With the switches 25*a* and 25*b* in the position illustrated in FIGURE 2, the tape will be continuously reversed at the end of each channel so that the reproducing apparatus will continue to operate indefinitely.

When the moving contacts *a* of switches 25*a* and 25*b* are moved to the position where they engage stationary contacts *c* or *d*, the signal from the detecting circuit 7 is applied to either one of the transistors 16*a* or 16*b*, and the tape 2 is driven only once in both directions, and does not replay continuously.

When the moving contacts *a* of the switches **25*a* and 25*b*** are engaged with the stationary contacts *e*, the automatic changeover of the bistable multivibrator circuit 8 never occurs, so that the magnetic tape 2 is transported only in one direction.

By pushing the switches **27*a* or 27*b*, either of the transistors 16*a* or 16*b* can be switched off, and the other switched on independently of the multivibrator circuit 8, so that the circuit 8** can be overridden as desired. This enables one to drive the tape in any desired direction at any time.

When the direction of tape drive is reversed, the tape 2 runs at a constant speed from the reversing time ($X_{13}$ in FIGURE 4) to the time $X_{15}$ at which time the reproduction of signal $S_2$ is initiated, so that the signal $S_2$ is reproduced at a predetermined time interval from its starting point N.

Since the detecting circuit 7 is controlled by the signal $S_3$ produced by mixing the signals $S_1$ and $S_2$ of the first and second channels, even if one signal drops to zero or is at an extremely low level in one channel, the detecting circuit 7 is controlled by the signal of the other channel to hold the circuit 8 in its operative condition, thereby insuring the driving of the magnetic tape 2 in the same direction. The action of the circuit is thus of the "or" logic type.

While the present invention has been described in conjunction with a tape having only two tracks thereon, it should be evident that the invention is equally applicable to magnetic tapes having four or more magnetic tracks. In that case, signals from all the tracks or from the first and second tracks are mixed together and applied to the detecting circuit 7 illustrated in FIGURE 3.

Furthermore, it is also possible to employ a rapid rewind system in conjunction with the circuits of the present invention when it is desired to scan a plurality of tracks only in one direction.

It should also be evident that various modifications can be made to the described embodiments without departing from the scope of the present invention.

We claim as our invention:

1. A magnetic reproducing system for a multi-track record tape comprising a reversible drive means, a first magnetic head positioned to scan one of said tracks, a second magnetic head positioned to scan another of said tracks, a mixer circuit receiving the outputs of said heads and operating to provide a control signal whenever at least one of said heads supplies a signal thereto, control means responsive to said control signal for reversing said drive means, and time delay means interposed between said mixer and said control means delaying the reversal of said drive means for a predetermined time interval after cessation of an output from said mixer circuit.

2. The system of claim 8 in which said control means includes a bistable multivibrator.

3. The system of claim 2 in which said multivibrator is biased to serve as an astable multivibrator in the absence of a signal from said mixer means.

4. The system of claim 8 which includes a detector circuit receiving the output of said mixer means and a bistable multivibrator receiving the output of said detector circuit, said detector circuit including a time delay network providing a bias to said multivibrator to cause said multivibrator to become astable in the absence of a signal into said detector circuit.

5. The system of claim 4 in which the time constant of said time delay network is shorter than the period of oscillation of the multivibrator in its astable condition.

6. The system of claim 4 in which the time constant of said time delay network is in the range from 3 to 10 seconds.

7. The system of claim 4 in which a half period of said multivibrator in its astable state is in the range from 10 to 20 seconds.

References Cited

UNITED STATES PATENTS

| | | | |
|---|---|---|---|
| 2,519,567 | 8/1950 | Handschin | 179—100.2 |
| 2,553,410 | 5/1951 | Handschin | 179—100.2 |
| 2,932,696 | 4/1960 | Shipman | 179—100.2 |
| 3,298,006 | 1/1967 | Milenkovic et al. | 179—100.2 |

BERNARD KONICK, Primary Examiner

J. P. MULLINS, Assistant Examiner